United States Patent
Chang et al.

(10) Patent No.: US 7,155,178 B2
(45) Date of Patent: Dec. 26, 2006

(54) CIRCUIT SYSTEM FOR WIRELESS COMMUNICATIONS

(75) Inventors: Kevin Chang, Hsinchu (TW); Gang-Yi Lin, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 380 days.

(21) Appl. No.: 10/767,542

(22) Filed: Jan. 29, 2004

(65) Prior Publication Data

US 2005/0170790 A1    Aug. 4, 2005

(51) Int. Cl.
H04B 7/02      (2006.01)
H04B 1/034    (2006.01)
H04B 1/18      (2006.01)

(52) U.S. Cl. .................... 455/101; 455/73; 455/95; 455/168.1; 379/429

(58) Field of Classification Search .......... 455/101.95, 455/130, 168.1, 269, 280, 293, 334, 339, 455/341, 403, 73, 550.1, 562.1; 379/429
See application file for complete search history.

(56) References Cited

U.S. PATENT DOCUMENTS 5,715,525 A * 2/1998 Tarusawa et al. .......... 455/101
6,075,995 A * 6/2000 Jensen ...................... 455/552.1
6,560,448 B1 * 5/2003 Baldwin et al. .......... 455/234.1
6,735,422 B1 * 5/2004 Baldwin et al. .......... 455/232.1
6,876,836 B1 * 4/2005 Lin et al. ...................... 455/73
2004/0018814 A1 * 1/2004 Lin et al. ...................... 455/73

* cited by examiner

*Primary Examiner*—Tony T. Nguyen
(74) *Attorney, Agent, or Firm*—Thomas, Kayden, Horstemeyer & Risley

(57) ABSTRACT

A circuit system for wireless communications via two antennas. The circuit system includes a printed circuit board having a predetermined area devoid of a solder mask. According to the invention, an antenna switch, filter, and power amplifier are mounted on the printed circuit board within the predetermined area. The antenna switch connects the filter and the power amplifier with the two antennas. The filter blocks unwanted frequency components in an RF receive signal from either of the antennas. A transceiver is responsible for down-converting the RF receive signal a baseband receive signal and up-converting a baseband transmit signal to an RF transmit signal. A first matching network coupled between the filter and the transceiver transforms the RF receive signal from single-ended to differential. Likewise, a second matching network coupled between the transceiver and the power amplifier transforms the RF transmit signal from differential to single-ended.

20 Claims, 4 Drawing Sheets

CIRCUIT SYSTEM FOR WIRELESS COMMUNICATIONS

BACKGROUND OF THE INVENTION

1. Field of the Invention

The invention relates to hardware design techniques, and more particularly to a circuit system for wireless communications.

2. Description of the Related Art

A wireless local area network (wireless LAN or WLAN) is a cellular network that facilitates communication via radio signals instead of wires. WLANs are used increasingly in both home and corporate environments. Innovations in WLAN technology help people to work and communicate more efficiently. The advantages of high mobility and no need for cabling and other fixed infrastructure have proven to be a boon for many users. Wireless LAN users can use the same network applications as in an Ethernet LAN. WLAN adapter cards used on laptop and desktop systems support the same protocols as Ethernet adapter cards. For most users, there is no noticeable functional difference between a wired Ethernet desktop computer and mobile WLAN workstation other than the added benefit of mobility within the WLAN.

In 1997, the first wireless Ethernet standard, known simply as 802.11, was adopted and published by the IEEE. This unified standard provided several modes of operation and data rates up to a maximum of two megabits per second (Mbps). Work soon began on improving the performance of 802.11. The eventual results were two new but incompatible versions of the standard, 802.11b and 802.11a. The "b" version operated in the same frequency range as the original 802.11, the 2.4 GHz Industrial-Scientific-Medical (ISM) band, but the "a" version ventured into the 5 GHz Unlicensed National Information Infrastructure (U-NII) band. 802.11b mandated complementary code keying (CCK) for rates of 5.5 and 11 Mbps, and included as an option Packet Binary Convolutional Coding (PBCC) for throughput rates of 5.5 and 11 Mbps, and additional range performance. 802.11a turned to another multi-carrier coding scheme, Orthogonal Frequency Division Multiplexing (OFDM) achieving data rates up to 54 Mbps. In June of 2003, IEEE announced its final approval of the IEEE 802.11g standard which adopted a hybrid solution that included the same OFDM coding and provided the same physical data rates as 802.11a. Nonetheless, 802.11g occupied the 2.4 GHz band of the original 802.11 standard.

Designing the circuit of any system containing radio frequency (RF) signals is always critical and challenging. As data rate increases, printed circuit board (PCB) layout becomes more complex especially for compact devices, such as 802.11a/b/g MiniPCI or PCMCIA cards. In order to achieve the benefits offered by these devices, particular attention must be paid to the requirements of circuits that will be more sensitive in higher frequencies. An unsatisfactory design may otherwise lead to technical problems in the WLAN devices, manifesting itself in reduced coverage or data throughput. Therefore, what is needed is a circuit design for use in WLAN systems, which addresses some of the above mentioned and other problems of the related art.

SUMMARY OF THE INVENTION

The present invention is generally directed to a circuit system for wireless communications. The system transmits and receives radio frequency (RF) signals via a first and second antenna. According to one aspect of the invention, the circuit system comprises a printed circuit board having a predetermined area devoid of a solder mask. Critical RF front-end components including an antenna switch, first filter and power amplifier are mounted on the printed circuit board within the predetermined area. The antenna switch has at least two input ports and at least two output ports, where the output ports are coupled to the first and the second antennas, respectively; it enables connection of any of the input ports to either of the output ports. The first filter is coupled to one input port of the antenna switch to block unwanted frequency components in an RF receive signal from either antenna. A first matching network is coupled between the first filter and a transceiver to transform the RF receive signal from single-ended to differential. For transmission via the RF front-end, a converter is employed to convert a baseband transmit signal from digital to analog. Additionally, a second filter is coupled between the converter and the transceiver in order to match output impedance of the converter to input impedance of the transceiver. The transceiver is responsible for down-converting the RF receive signal to a baseband receive signal and up-converting the baseband transmit signal to the RF transmit signal. A counterpart in the transmission path, a second matching network is coupled between the transceiver and the power amplifier to transform the RF transmit signal from differential to single-ended. The power amplifier is coupled between the second matching network and the other input port of the antenna switch. With the power amplifier, the RF transmit signal from the second matching network is boosted and then transferred toward either of the antennas through the antenna switch. Note that each matching network having a common node and a pair of differential nodes includes a first capacitor connected between the common node and a first node of the differential nodes, a first inductor connected between the first node of the differential nodes and ground, a second inductor connected between the common node and a second node of the differential nodes, a second capacitor connected between the second node of the differential nodes and ground, and an adjustable inductor connected across the differential nodes and in parallel with the transceiver.

According to another aspect of the invention, a circuit system for wireless communications comprises a printed circuit board having a predetermined area devoid of a solder mask. The critical RF front-end components including a filter and power amplifier are mounted on the printed circuit board within the predetermined area. The filter blocks unwanted frequency components in an RF receive signal. A first matching network is coupled between the filter and a transceiver to transform the RF receive signal from single-ended to differential. The transceiver is responsible for down-converting the RF receive signal to a baseband receive signal and up-converting the baseband transmit signal to an RF transmit signal. A second matching network is coupled between the transceiver and the power amplifier to transform the RF transmit signal from differential to single-ended. The RF transmit signal through the second matching network is boosted with the power amplifier. Note that each matching network having a common node and a pair of differential nodes includes a first capacitor connected between the common node and a first node of the differential nodes, a first inductor connected between the first node of the differential nodes and ground, a second inductor connected between the common node and a second node of the differential nodes, a second capacitor connected between the second node of the differential nodes and ground, and an adjustable inductor connected across the differential nodes and in parallel with the transceiver.

According to yet another aspect of the invention, a radio frequency (RF) front-end circuit system is disclosed. The circuit system of the invention, which transmits and receives RF signals via a first and second antenna, comprises a printed circuit board having a predetermined area devoid of a solder mask. Critical RF front-end components including an antenna switch, filter and power amplifier are mounted on the printed circuit board within the predetermined area. The antenna switch has at least two input ports and at least two output ports, where the output ports are coupled to the first and the second antennas, respectively; it enables connection of any of the input ports to either of the output ports. The filter is coupled to one of the input ports of the antenna switch to block unwanted frequency components in an RF receive signal from either antenna. Coupled to the other input port of the antenna switch, the power amplifier boosts an RF transmit signal for transfer to either of the antennas through the antenna switch.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Reference throughout this specification to "one embodiment" or "an embodiment" indicates that a particular feature, structure, or characteristic described in connection with the embodiments is included in at least one embodiment of the present invention. Thus, the appearances of the phrase "in one embodiment" or "an embodiment" in various places throughout this specification are not necessary all referring to the same embodiment. Furthermore, the particular features, structures, or characteristics may be combined in one or more embodiments. As to the accompanying drawings, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
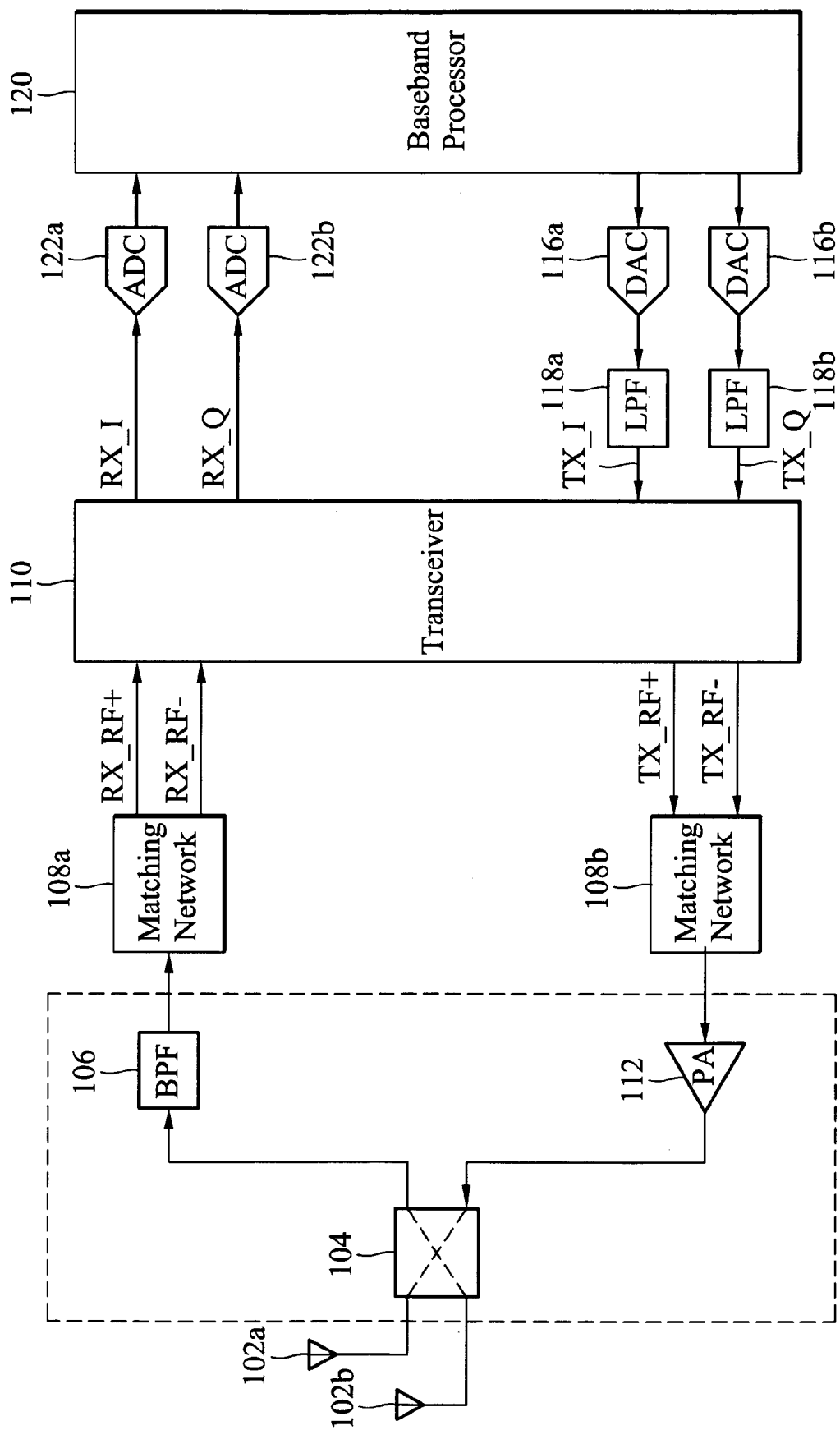
FIG. 1 is a block diagram illustrating a circuit system for wireless communications according to an embodiment of the invention.

FIG. 1 is a block diagram of a circuit system providing 802.11a networking to a host system (not shown) according to the invention. The circuit system of the invention is coupled to, but is not limited to, two antennas 102a and 102b for diversity. Transmit and receive signals in the 5 GHz band are transferred with the antennas 102a and 102b through an antenna switch 104. As depicted, the antenna switch 104 has four ports: two outputs (antennas) and two inputs (transmit and receive), where the two output ports are coupled to the antennas 102a and 102b, respectively. The antenna switch 104 enables connection of any of the input ports to either of the output ports. A bandpass filter (hereinafter abbreviated as BPF) 106 is coupled to one of the input ports of the antenna switch 106, thereby selecting a frequency band around 5 GHz and blocking unwanted frequency components in the 5 GHz receive signal from either antenna. Two matching networks 108a and 108b are used in transmit and receive paths, respectively, for transforming a signal from single-ended to differential or vice versa. In the receive path, the 5 GHz receive signal undergoes the single-ended to differential transformation by the matching network 108a before entering a subsequent transceiver 110. As such, the single-ended receive signal passes through the matching network 108a and then becomes differential signals RX_RF+ and RX_RF− 180° out of phase with each other. The transceiver 110 is responsible for down-converting the RX_RF+ and RX_RF− signals from the 5 GHz band to the baseband. Preferably, the transceiver 110 utilizes the zero-IF architecture to eliminate the need for intermediate frequency (IF) and baseband filters. The baseband receive signal contains in-phase (I) and quadrature (Q) components, RX_I and RX_Q. Each of the signals RX_I and RX_Q is designed in the form of differential signaling. However, this is merely an example and embodiments of the present invention are not limited in this respect. The signals RX_I and RX_Q then pass through analog-to-digital converters (hereinafter abbreviated as ADCs) 122a and 122b to a baseband processor 120, the origin and destination for all the front-end signals. The baseband processor 120 deals with the interface to the host system and provides data formatting, encapsulation, and decapsulation required by the IEEE 802.11a standard.

The transmit signal is transferred in a reverse order from the baseband processor 120 through the antenna switch 104 to either of the antennas 102a and 102b. The in-phase and quadrature outputs of the baseband processor 120 are applied to digital-to-analog converters (hereinafter abbreviated as DACs) 116a and 116b, each of which is able to convert a baseband signal from digital to analog. Additionally, off-chip low pass filters (hereinafter abbreviated as LPFs) are coupled between the transceiver 110 and the DACs 116a–b in order to match an output impedance of each DAC to an input impedance of the transceiver 110. Each of the off-chip LPFs operates at a baseband frequency and has a low pass filter characteristic to attenuate the unwanted higher-frequency spurious signal content. Next, the I and Q components of the baseband transmit signal, TX_I and TX_Q, are fed to the RF front-end section where the transceiver 110 up-converts the transmit signal from the baseband to the 5 GHz band. In one embodiment, the signals TX_I and TX_Q from the baseband processor 120 to the transceiver 110 are designed in the form of differential signaling. However, this is merely an example and embodiments of the present invention are not limited in this respect. The 5 GHz differential outputs of the transceiver 110, TX_RF+ and TX_RF−, undergoes the differential to single-ended transformation by the matching network 108b before entering a subsequent power amplifier 112. The power amplifier (hereinafter abbreviated as PA) 112 is coupled between the matching network 108b and the other input port of the antenna switch 104. With the PA 112, the RF transmit signal from the matching network 108b is boosted and then transferred toward either of the antennas 102a and 102b through the antenna switch 104.

Figure 2:
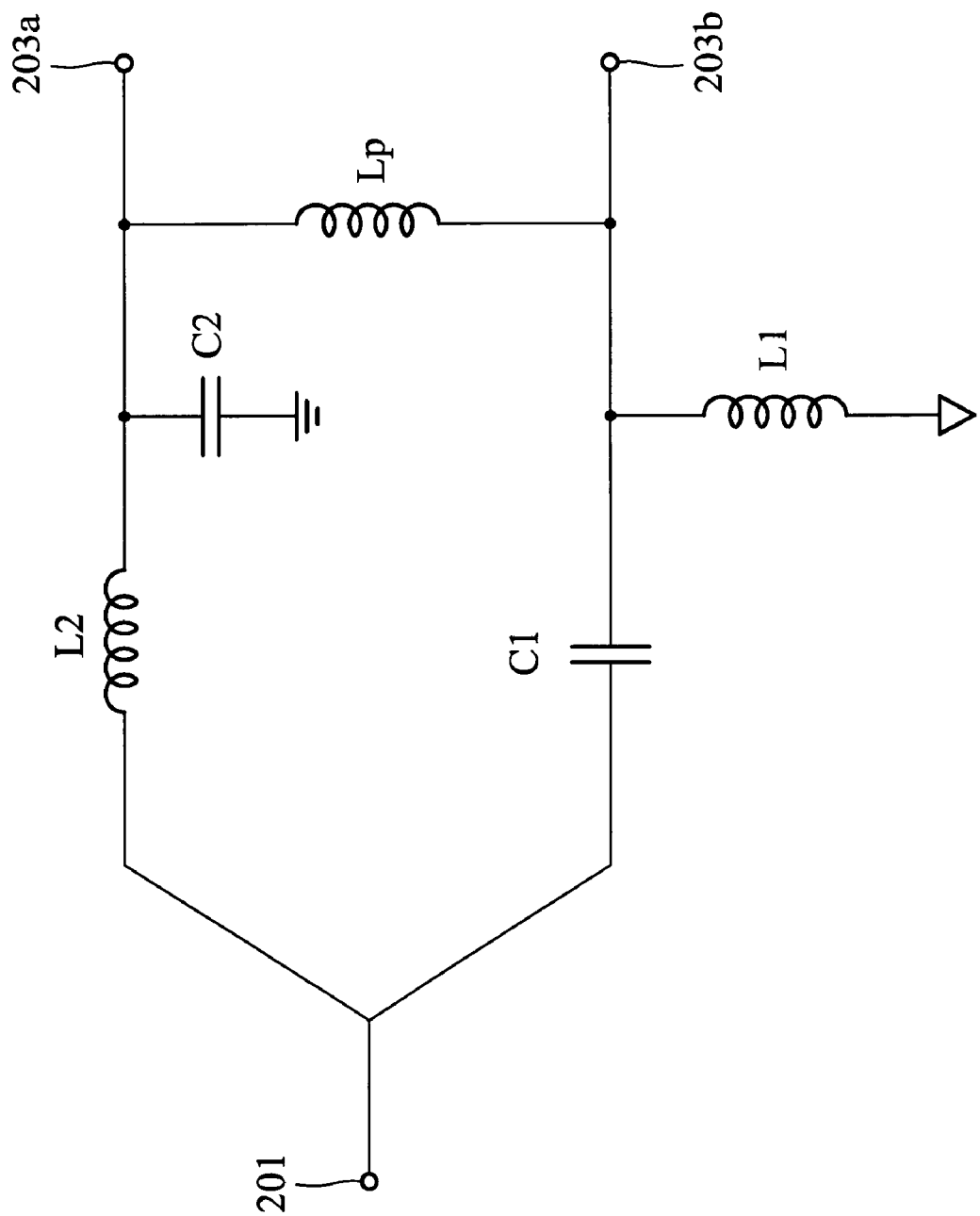
FIG. 2 is a schematic diagram illustrating the matching network of FIG. 1 in detail according to an embodiment of the invention.

The RF inputs of the transceiver 110 require external impedance matching and single-ended to differential conversion, while the RF outputs thereof require external impedance matching and differential to single-ended conversion. The differential to single-ended (vice versa) conversion and impedance matching are achieved through the use of matching networks 108a and 108b. With reference to FIG. 2, an embodiment for the matching networks is illustrated. According to the invention, each matching network is implemented with a combination of passive components. As depicted, the matching network has a common node 201 to couple a single-ended source or load, and a pair of differential nodes 203a and 203b to couple a differential source or load. In the context of FIG. 1, for example, the matching network 108a has its common node coupled to the output of the BPF 106 and its differential nodes coupled to the RF inputs of the transceiver 110. It can be seen that the matching network shown in FIG. 2 includes two inductors L1–L2 and two capacitors C1–C2 to form an LC/CL network. The capacitor C1 is connected between the node 201 and the node 203b; the inductor L1 is connected between the node 203b and ground. On the other hand, the inductor L2 is connected between the node 201 and the node 203a; the capacitor C2 is connected between the node 203a and ground. Furthermore, an adjustable inductor Lp is connected across the differential nodes 203a and 203b and further in parallel with the transceiver 110. The adjustable inductor Lp is designed to exactly match the differential input or output impedance of the transceiver 110. However, this is merely an example of a matching network and embodiments of the present invention are not limited in this respect.

Figure 3:
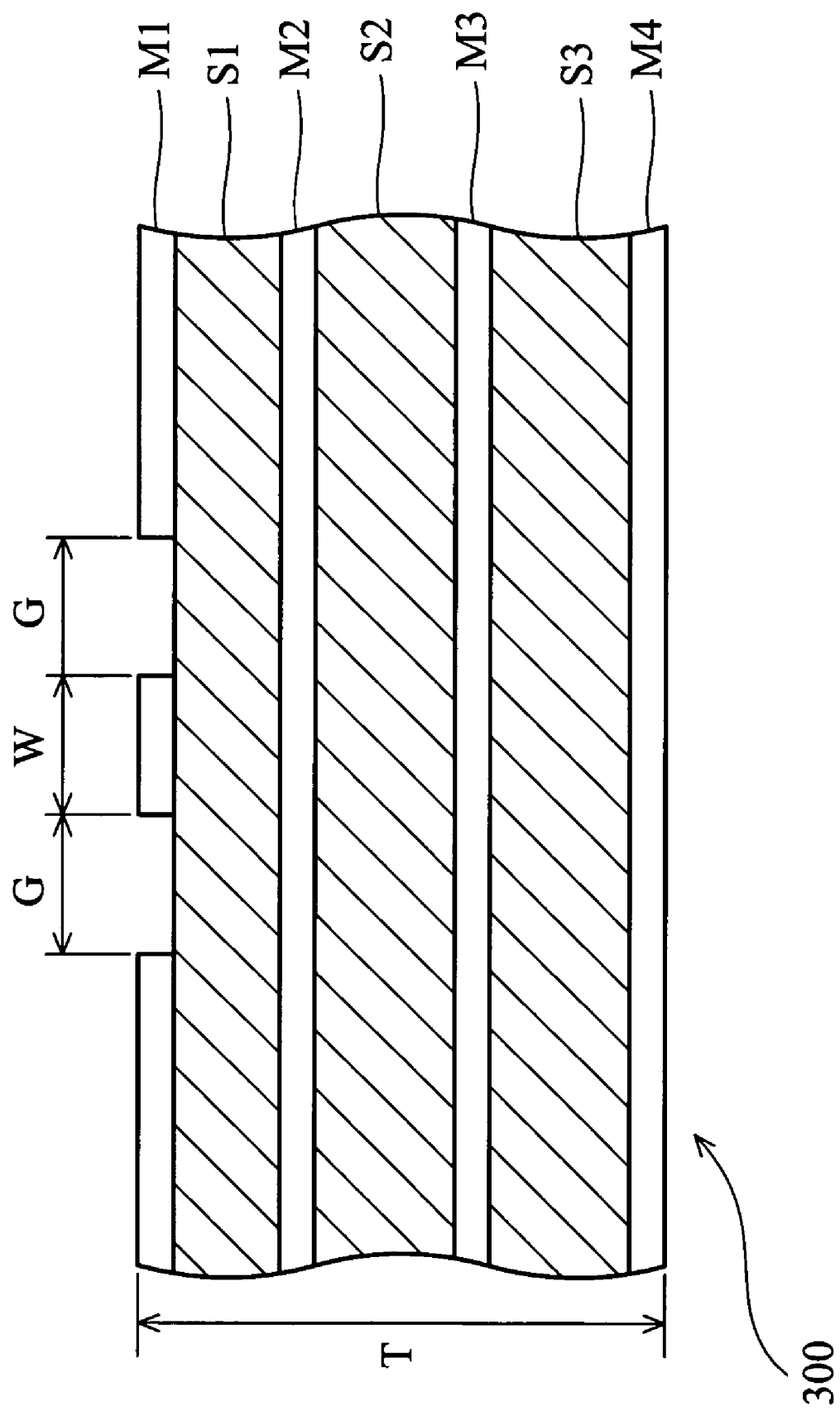
FIG. 3 is a cross section of a multi-layer printed circuit board according to an embodiment of the invention.

The transceiver, baseband processor and surrounding components involved in the circuit system of the invention are positioned on a printed circuit board (hereinafter abbreviated as PCB) 300. Since a poor impedance matching can cause both low transmitter power and poor receiver sensitivity, design and layout of the PCB 300 must be carefully considered. The impedance of a printed circuit trace strongly depends on the dielectric constant of the PCB substrate and its thickness. In general, a generic FR4 substrate exerts relatively poor control over both parameters, possibly resulting in substantial deviation from the desired impedance. Nonetheless, the PCB 300 is fabricated with the ubiquitous, inexpensive FR4 substrate by means of very tight impedance control. With reference to FIG. 3, a cross section of the PCB 300 is illustrated. For illustrative purposes, only a portion is shown and the dimensions are not to scale. The PCB 300 is constructed from four layers of copper, M1–M4, and three layers of FR4 substrate, S1–S4. The most critical factors are the thickness of the FR4 insulating material, its dielectric constant and the width of the RF front-end signal trace, since these have the most pronounced effect on the impedance. Preferably, both the S1 and S3 layers of FR4 substrate have a thickness of about 9 mils, the S2 layer of FR4 substrate, a thickness of about 16 mils, with the overall thickness of the PCB 300, T, equal to 40 mils approximately. The RF front-end signal traces, formed on the PCB 300 and used to couple the antenna switch, the BPF filter, the PA, the matching networks and the transceiver, have a width of about W as shown in FIG. 3, where W=16.5±1.5 mils. Inclusion of a ground plane between the RF signal traces reduces leakage and enhances isolation. FIG. 3 also indicates that the spacing, G, between the RF signal traces and the ground plane should be at least 15 mils. More particularly, the PCB 300 normally coated with a solder mask is designed to form a surface area devoid of the solder mask thereon. For tight impedance control on the critical RF front-end section, the antenna switch, the BPF and the PA must be mounted on the PCB 300 within the solder mask-free area.

Figure 4:
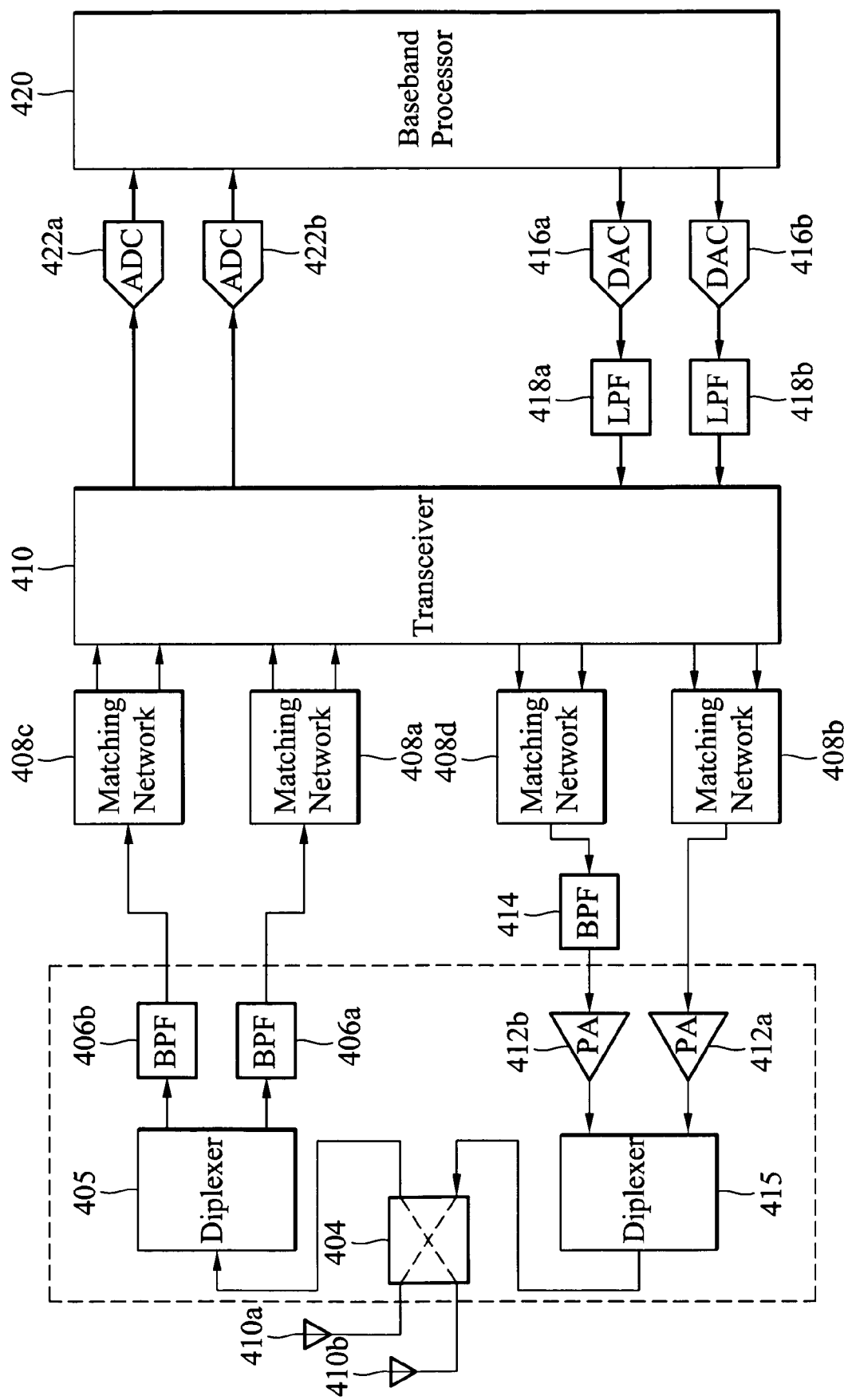
FIG. 4 is a block diagram illustrating a circuit system for wireless communications according to an alternative embodiment of the invention.

FIG. 4 is an alternative embodiment illustrating a circuit system for the 802.11a/b/g applications. For brevity, the elements of FIG. 4 similar to those of FIG. 1 are not described in detail. This dual-band circuit system is coupled to two antennas 402a and 402b operating in both 2.4 GHz and 5 GHz bands. A 5 GHz receive signal is transferred from either of the antennas 402a and 402b to a dual-band transceiver 410 through an antenna switch 404, a diplexer 405, a BPF 406a and a matching network 408a. Similarly, a 2.4 GHz receive signal is transferred from either of the antennas 402a and 402b to the dual-band transceiver 410 through the antenna switch 404, the diplexer 405, a BPF 406b and a matching network 408c. On the other hand, a 5 GHz transmit signal is transferred from the dual-band transceiver 410 to either of the antennas 402a and 402b through a matching network 408b, a PA 412a, a diplexer 415 and the antenna switch 404, while a 2.4 GHz transmit signal is transferred from the dual-band transceiver 410 to either of the antennas 402a and 402b through a matching network 408d, a BPF 414, a PA 412b, the diplexer 415 and the antenna switch 404. In this case, the PA 412a operates in a frequency band around 5 GHz, and the PA 412b in a frequency band around 2.4 GHz. Each of the diplexers 405 and 415 has a common (antenna) port and two more ports for 5 GHZ and 2.4 GHz. These diplexers are transparent to 5 GHz signals between the common and 5 GHz port. Likewise, these diplexers are transparent to 2.4 GHz signals between the common and 2.4 GHz port. In the 2.4 GHz transmit path, the BPF 414 removes the different by-products of the internal 5 GHz voltage-controlled oscillator (VCO) of the transceiver 410. As described earlier, the antenna switch 404, the diplexers 405 and 415, the BPFs 406a and 406b and the PAs 412a and 412b must be mounted on a PCB like the one shown in FIG. 3 and positioned within a predetermined area devoid of solder mask. In the dual-band circuit system, the baseband section similar to that of FIG. 1 comprises a baseband processor 420, ADCs 422a and 422b, DACs 416a and 416b, as well as LPFs 418a and 418b, in which the baseband processor 420 deals with the data formatting, encapsulation and decapsulation required by the IEEE 802.11a/b/g standards.

In view of the above, the present invention discloses a circuit system for wireless communications such as 802.11a/b/g applications. Not only can the circuit system of the invention overcome the problems of the related art, but it can also provide a solution to increase overall system cost effectiveness.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A circuit system for wireless communications, the system transmitting and receiving radio frequency (RF) signals via a first and second antenna, comprising:
    a printed circuit board having a predetermined area devoid of a solder mask;
    an antenna switch, mounted on the printed circuit board within the predetermined area, having at least two input ports and at least two output ports, enabling connection of any of the input ports to either of the output ports, where the output ports are coupled to the first and the second antennas, respectively;
a first filter, mounted on the printed circuit board within the predetermined area and coupled to one of the input ports of the antenna switch, blocking unwanted frequency components in an RF receive signal from either of the antennas;
a first matching network transforming the RF receive signal from single-ended to differential;
a converter converting a baseband transmit signal from digital to analog;
a transceiver down-converting the RF receive signal supplied by the first matching network to a baseband receive signal, and up-converting the baseband transmit signal passing through the converter to an RF transmit signal;
a second filter coupled between the converter and the transceiver, matching an output impedance of the converter to an input impedance of the transceiver;
a second matching network transforming the RF transmit signal from differential to single-ended; and
a power amplifier, mounted on the printed circuit board within the predetermined area and coupled between the second matching network and the other input port of the antenna switch, boosting the RF transmit signal from the second matching network, whereby the RF transmit signal undergoing the boost is transferred to either antenna through the antenna switch;
wherein the first matching network is coupled between the first filter and the transceiver, and the second matching network is coupled between the transceiver and the power amplifier;
wherein each matching network, having a common node and a pair of differential nodes, includes a first capacitor connected between the common node and a first node of the differential nodes, a first inductor connected between the first node of the differential nodes and ground, a second inductor connected between the common node and a second node of the differential nodes, a second capacitor connected between the second node of the differential nodes and ground, and an adjustable inductor connected across the differential nodes and in parallel with the transceiver.

2. The circuit system of claim 1 wherein the transceiver conforms to the IEEE 802.11a standard, which down-converts the RF receive signal in a band around a carrier frequency of 5 GHz to the baseband receive signal and up-converts the baseband transmit signal to the RF transmit signal in the band around the carrier frequency of 5 GHz.

3. The circuit system of claim 2 wherein the first filter is a bandpass filter selecting a frequency band around 5 GHz.

4. The circuit system of claim 1 wherein the transceiver conforms to the IEEE 802.11b standard, which down-converts the RF receive signal in a band around a carrier frequency of 2.4 GHz to the baseband receive signal and up-converts the baseband transmit signal to the RF transmit signal in the band around the carrier frequency of 2.4 GHz.

5. The circuit system of claim 4 wherein the first filter is a bandpass filter selecting a frequency band around 2.4 GHz.

6. The circuit system of claim 1 wherein the second filter operating at a baseband frequency has a low pass filter characteristic.

7. The circuit system of claim 1 wherein the printed circuit board, including four layers of copper and three layers of FR4 substrate, has a thickness of about 40 mils.

8. The circuit system of claim 1 wherein signal traces, formed on the printed circuit board and coupled among the antenna switch, the first filter, the power amplifier, the first and the second matching networks, and the transceiver, range in width from 15 mils to 18 mils, and wherein the spacing between the signal traces and a ground plane is at least 15 mils.

9. The circuit system of claim 1 wherein the transceiver is capable of operating in dual frequency bands and conforms to both IEEE 802.11a and 802.11b standards.

10. A circuit system for wireless communications, comprising:
a printed circuit board having a predetermined area devoid of a solder mask;
a filter, mounted on the printed circuit board within the predetermined area, blocking unwanted frequency components in an RF receive signal;
a first matching network transforming the RF receive signal from single-ended to differential;
a transceiver down-converting the RF receive signal supplied by the first matching network to a baseband receive signal, and up-converting a baseband transmit signal generated by a baseband processor to an RF transmit signal;
a second matching network transforming the RF transmit signal from differential to single-ended; and
a power amplifier, mounted on the printed circuit board within the predetermined area and coupled to the second matching network, boosting the RF transmit signal from the second matching network;
wherein the first matching network is coupled between the first filter and the transceiver, and the second matching network is coupled between the transceiver and the power amplifier;
wherein each matching network, having a common node and a pair of differential nodes, includes a first capacitor connected between the common node and a first node of the differential nodes, a first inductor connected between the first node of the differential nodes and ground, a second inductor connected between the common node and a second node of the differential nodes, a second capacitor connected between the second node of the differential nodes and ground, and an adjustable inductor connected across the differential nodes and in parallel with the transceiver.

11. The circuit system of claim 10 wherein the transceiver conforms to the IEEE 802.11a standard, which down-converts the RF receive signal in a band around a carrier frequency of 5 GHz to the baseband receive signal and up-converts the baseband transmit signal to the RF transmit signal in the band around the carrier frequency of 5 GHz.

12. The circuit system of claim 11 wherein the first filter is a bandpass filter selecting a frequency band around 5 GHz.

13. The circuit system of claim 10 wherein the transceiver conforms to the IEEE 802.11b standard, which down-converts the RF receive signal in a band around a carrier frequency of 2.4 GHz to the baseband receive signal and up-converts the baseband transmit signal to the RF transmit signal in the band around the carrier frequency of 2.4 GHz.

14. The circuit system of claim 13 wherein the first filter is a bandpass filter selecting a frequency band around 2.4 GHz.

15. The circuit system of claim 10 wherein the printed circuit board, including four layers of copper and three layers of FR4 substrate, has a thickness of about 40 mils.

16. The circuit system of claim 10 wherein signal traces, formed on the printed circuit board and coupled among the filter, the power amplifier, the first and the second matching networks, and the transceiver, range in width from 15 mils to 18 mils, and wherein the spacing between the signal traces and a ground plane is at least 15 mils.

17. The circuit system of claim 10 wherein the transceiver is capable of operating in dual frequency bands and conforms to both IEEE 802.11a and 802.11b standards.

18. A radio frequency (RF) front-end circuit system for transmitting and receiving RF signals via a first and second antenna, comprising:
  a printed circuit board having a predetermined area devoid of a solder mask;
  an antenna switch, mounted on the printed circuit board within the predetermined area, having at least two input ports and at least two output ports, enabling connection of any of the input ports to either of the output ports, where the output ports are coupled to the first and the second antennas, respectively;
  a filter, mounted on the printed circuit board within the predetermined area and coupled to one of the input ports of the antenna switch, blocking unwanted frequency components in an RF receive signal from either of the antennas; and
  a power amplifier, mounted on the printed circuit board within the predetermined area and coupled to the other input port of the antenna switch, boosting a RF transmit signal to be transferred to either antenna through the antenna switch.

19. A radio frequency (RF) front-end circuit system for transmitting and receiving RF signals via a first and second antenna, comprising:
  a printed circuit board having a predetermined area devoid of a solder mask and having a thickness of about 40 mils, including four layers of copper and three layers of FR4 substrate
  an antenna switch, mounted on the printed circuit board within the predetermined area, having at least two input ports and at least two output ports, enabling connection of any of the input ports to either of the output ports, where the output ports are coupled to the first and the second antennas, respectively;
  a filter, mounted on the printed circuit board within the predetermined area and coupled to one of the input ports of the antenna switch, blocking unwanted frequency components in an RF receive signal from either of the antennas; and
  a power amplifier, mounted on the printed circuit board within the predetermined area and coupled to the other input port of the antenna switch, boosting a RF transmit signal to be transferred to either antenna through the antenna switch.

20. The RF front-end circuit system of claim 19 wherein signal traces, formed on the printed circuit board and coupled among the antenna switch, the filter, and the power amplifier, range in width from 15 mils to 18 mils, and wherein the spacing between the signal traces and a ground plane is at least 15 mils.

* * * * *